US012460473B2

(12) United States Patent
Frost

(10) Patent No.: US 12,460,473 B2
(45) Date of Patent: Nov. 4, 2025

(54) GARAGE DOOR WITH SECURE DOOR ASSEMBLY FOR PACKAGES

(71) Applicant: Joe Frost, Phoenix, AZ (US)

(72) Inventor: Joe Frost, Phoenix, AZ (US)

( * ) Notice: Subject to any disclaimer, the term of this patent is extended or adjusted under 35 U.S.C. 154(b) by 62 days.

(21) Appl. No.: 18/383,208

(22) Filed: Oct. 24, 2023

(65) Prior Publication Data

US 2024/0151099 A1 May 9, 2024

Related U.S. Application Data

(60) Provisional application No. 63/419,984, filed on Oct. 27, 2022.

(51) Int. Cl.
*E06B 7/32* (2006.01)
*E06B 3/48* (2006.01)
*E06B 3/70* (2006.01)

(52) U.S. Cl.
CPC ................ *E06B 7/32* (2013.01); *E06B 3/485* (2013.01); *E06B 2003/7044* (2013.01); *E06B 2003/7046* (2013.01); *E06B 2003/7057* (2013.01)

(58) Field of Classification Search
CPC ........................ E06B 2003/7057; A47G 29/14
See application file for complete search history.

(56) References Cited

U.S. PATENT DOCUMENTS 700,863 A * 5/1902 Wansbrough ............. E06B 7/32 49/169
3,874,118 A * 4/1975 Robinson .................. E06B 7/32 49/169
3,978,616 A * 9/1976 Pennock ................... E06B 7/32 49/386
3,980,123 A * 9/1976 Vago ......................... E06B 3/78 160/232
4,833,828 A * 5/1989 Gingrande ................ E06B 5/02 49/386
4,914,864 A * 4/1990 Hohenfeld ................ E06B 7/32 49/506
5,269,097 A * 12/1993 Davlantes ................. E05C 9/00 49/169
8,136,207 B2 * 3/2012 Ambrose .................. E06B 7/32 49/386
9,447,631 B2 * 9/2016 Christie ..................... E06B 7/32
9,630,757 B1 * 4/2017 Capous .................. B65D 55/14
10,413,106 B1 * 9/2019 Valeriano ............. A47G 29/141
10,512,351 B1 * 12/2019 Valeriano ............ E05B 47/0001
(Continued)

FOREIGN PATENT DOCUMENTS

GB 118214 A * 8/1918

*Primary Examiner* — Catherine A Kelly
(74) *Attorney, Agent, or Firm* — Parsons & Goltry; Robert A. Parsons; Michael W. Goltry

(57) ABSTRACT

A Garage door with a secure door assembly including a garage door with a horizontally extending panel having a framework including parallel spaced apart horizontal members extending along a top edge and a bottom edge thereof and a secure package door assembly carried by the horizontally extending panel. The secure package door including an outer portion and an inner portion coupled together with the parallel spaced apart horizontal members captured therebetween. A door coupled by hinges to the outer portion and moveable between an open position and a closed position, A locking mechanism is included for locking the door in the closed position.

17 Claims, 6 Drawing Sheets

(56) References Cited

U.S. PATENT DOCUMENTS

| | | | | |
|---|---|---|---|---|
| 10,588,440 | B1 * | 3/2020 | Kajgana | E06B 3/5892 |
| 10,881,233 | B1 * | 1/2021 | Walsh | E06B 7/32 |
| 11,085,234 | B2 * | 8/2021 | Hunt | E06B 7/28 |
| 11,587,382 | B1 * | 2/2023 | Valentine | G07C 9/00896 |
| 11,649,665 | B1 * | 5/2023 | Earnest | E06B 3/485<br>52/211 |
| 12,144,448 | B1 * | 11/2024 | McCollum | A47G 29/141 |
| 2019/0257138 | A1 * | 8/2019 | Vitello | E06B 3/5081 |
| 2020/0385119 | A1 * | 12/2020 | Hanke | E06B 3/2605 |
| 2023/0016190 | A1 * | 1/2023 | Safstrom | E06B 1/52 |

* cited by examiner

GARAGE DOOR WITH SECURE DOOR ASSEMBLY FOR PACKAGES

CROSS-REFERENCE TO RELATED APPLICATIONS

This application claims the benefit of U.S. Provisional Patent Application No. 63/419,984, filed 27 Oct. 2022.

FIELD OF THE INVENTION

This invention relates to package delivery security devices.

More particularly, the present invention relates to access for delivering packages securely.

BACKGROUND OF THE INVENTION

In the field of package delivery to homes from email orders, mail orders and the like, finding a secure delivery location is becoming important. Packages may be delivered when the recipient is not present, resulting in packages sitting on porches or door steps for extended periods of time. Unattended packages are possible targets of theft. Delivery companies attempt to protect themselves in some cases with the delivery person taking a photograph of the package or otherwise documenting the delivery. Whether or not this has any benefit for the delivery company is subject to debate, but what is not questionable is whether the unattended package is vulnerable. Not only is the package vulnerable to theft, any packages left outside in this manner are also subjected to weather conditions which may be adverse such as rain or snow and the like.

Attempts to overcome these problems include containers that are positionable on a horizontal support surface such as a porch or patio. The containers have a lockable delivery opening for receiving a delivered parcel. While somewhat successful, these types of containers can look bad in front of a dwelling, and must have a location to be placed, not always available. Additionally, these containers must be securely anchored or be potentially carted off with the contained parcels.

It would be highly advantageous, therefore, to remedy the foregoing and other deficiencies inherent in the prior art.

An object of the present invention is to provide a secure place to deposit delivered packages.

SUMMARY OF THE INVENTION

Briefly, to achieve the desired objects and advantages of the instant invention, a garage door with a secure door assembly is provided. The garage door includes a horizontally extending panel having an inner surface, an outer surface, a top edge, a bottom edge and an opening formed by the removal of a portion therefrom. A framework includes parallel spaced apart horizontal members extending along the top edge and the bottom edge of the horizontally extending panel, the horizontally extending members bounding the opening. A secure package door assembly is carried by the horizontally extending panel and includes an outer portion and an inner portion. The outer portion includes sidewalls forming a frame defining an access opening and having an inner edge, an outer edge and a perimetric flange extending perpendicularly outwardly from the outer edge. The inner edge is inserted through the opening in the horizontally extending panel from the outer surface with the perimetric flange abutting an outer surface of the horizontally extending panel adjacent the parallel spaced apart horizontal members. The inner portion includes sidewalls forming a frame further defining the access opening and having an inner edge, an outer edge and a perimetric flange extending perpendicularly outwardly from the inner edge. The outer edge is inserted through the opening in the horizontally extending panel from the inner surface with the perimetric flange abutting an inner surface of the parallel spaced apart horizontal members. The inner portion and the outer portion are coupled together capturing the parallel spaced apart horizontal members between the perimetric flange of the outer portion and the perimetric flange of the inner portion. A door is coupled by hinges to the outer portion and movable between an open position allowing access through the opening and the access opening and a closed position closing the opening and the access opening. A locking mechanism is carried by the door, locking the door in the closed position.

Also provided is a method of installing a secure door assembly in a garage door. The method includes the steps of providing a garage door including a horizontally extending panel having an inner surface, and outer surface, a top edge, a bottom edge a framework including parallel spaced apart horizontal members extending along the top edge and the bottom edge of the horizontally extending panel. Forming an opening in the horizontally extending panel by the removing a portion therefrom between the parallel spaced apart horizontal members. Providing an outer portion including sidewalls forming a frame defining an access opening and having an inner edge, an outer edge and a perimetric flange extending perpendicularly outwardly from the outer edge and inserting the inner edge through the opening in the horizontally extending panel from the outer surface until the perimetric flange abuts an outer surface of the horizontally extending panel adjacent the parallel spaced apart horizontal members. Providing an inner portion including sidewalls forming a frame further defining the access opening and having an inner edge, an outer edge and a perimetric flange extending perpendicularly outwardly from the inner edge, and inserting the outer edge through the opening in the horizontally extending panel from the inner surface until the perimetric flange abuts an inner surface of the parallel spaced apart horizontal members with the inner portion and the outer portion coupled together.

BRIEF DESCRIPTION OF THE DRAWINGS

Specific objects and advantages of the invention will become readily apparent to those skilled in the art from the following detailed description of a preferred embodiment thereof, taken in conjunction with the drawings in which.

DETAILED DESCRIPTION OF A PREFERRED EMBODIMENT

Figure 1:
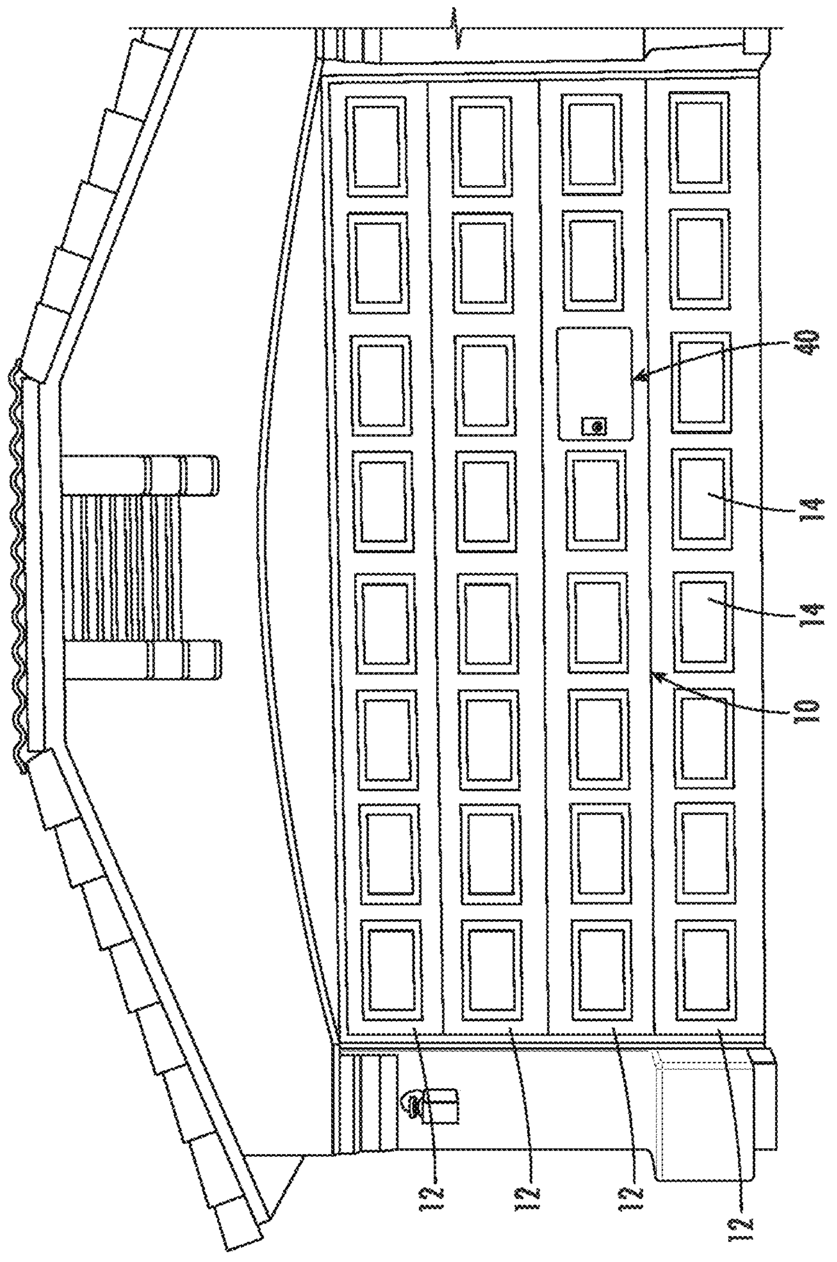
FIG. 1 is a front view of a secure package door assembly installed on a garage door.
Figure 2:
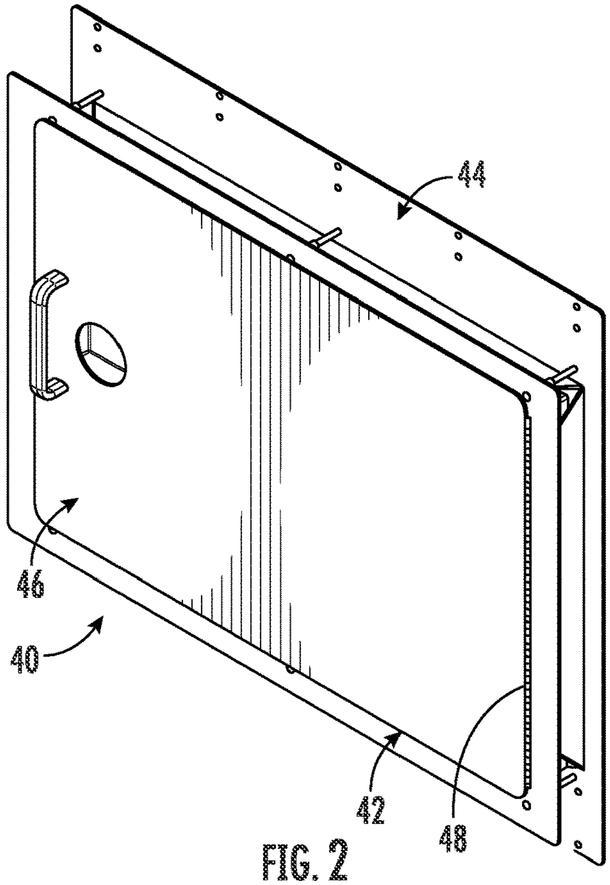
FIG. 2 is a perspective front view of the secure package door assembly of FIG. 1, according to the present invention.
Figure 7:
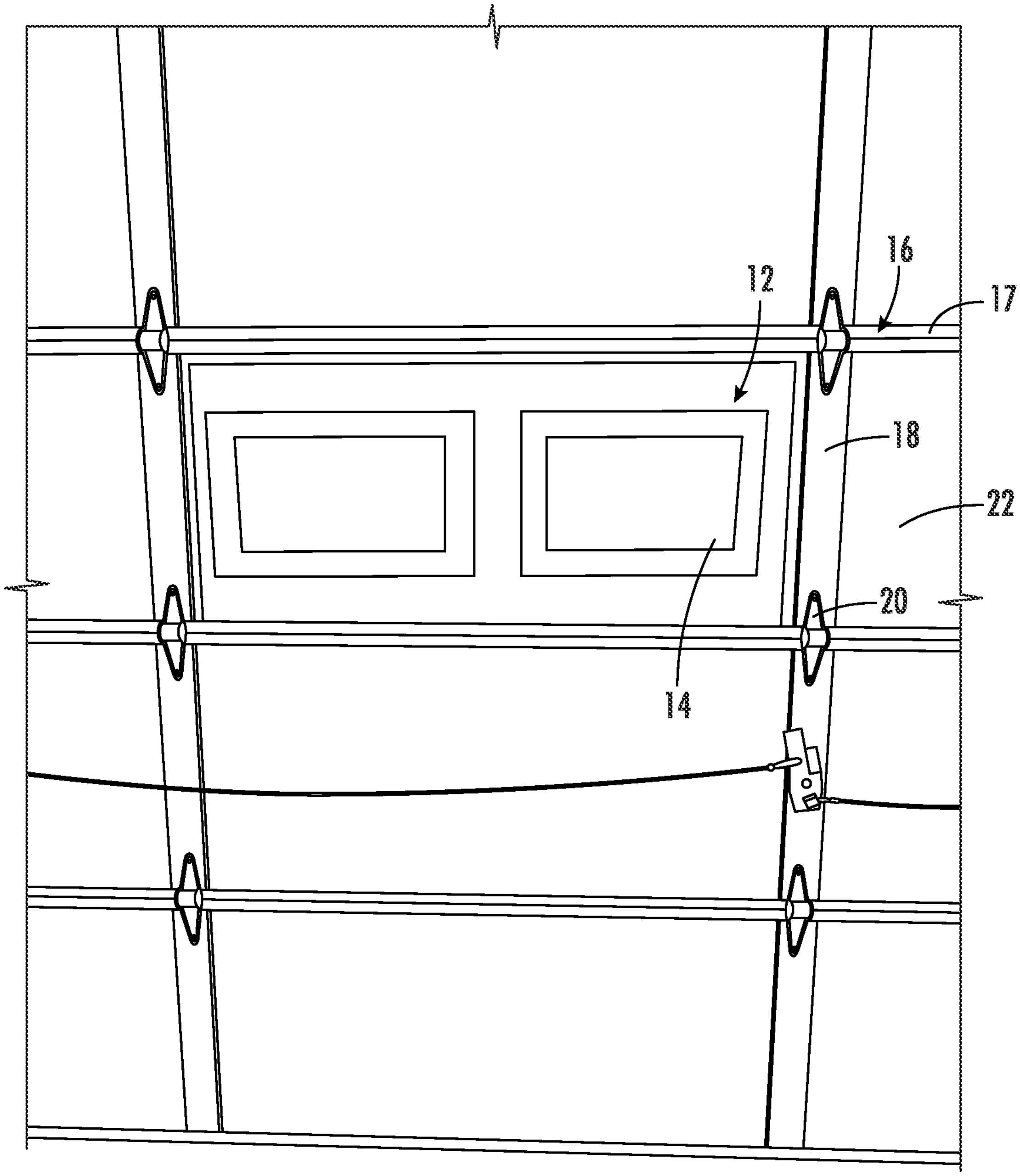
FIG. 7 is an enlarged partial view of the inside of the garage door with insulation removed.

Turning now to the drawings in which like reference characters indicate corresponding elements throughout the several views, attention is directed to FIG. 1 which illustrates a conventional garage door 10 having, multiple rectangular wood, steel, aluminum, fiberglass, or vinyl panels 12. Panels 12 extend horizontally and are coupled together to form garage door 10. In this example, each panel 12 includes a row of square sub-panels 14. Sub-panels 14 are simply decorative and can come in many different designs. For purposes of orientation, garage door 10 has an outer side, facing away from the interior of a garage, and an inner side facing towards the interior of a garage. Thus, an inner, inwardly and the like, direction is directed toward the interior of a garage and an outer, outwardly, and the like, direction indicates a direction away from the interior of the garage. With additional reference to FIG. 7, each panel 12 has a framework 16 including parallel spaced apart horizontal members 17 and parallel spaced apart vertical member 18, each extending inwardly. Hinges 20 engage framework 16 to secure panels 12 together, folding to allow the door to bend and retract as it moves along tracks to open or close. In this preferred embodiment, garage door 10 includes insulation panels 22 positioned on the inside of panels 12 surrounded and supported by framework 16.

Still referring to FIG. 1, with additional reference to FIGS. 2-5, a secure package door assembly, generally designed 40, is carried by one of panels 12 of garage door 10. A lower panel 12 is preferred, typically the second panel 12 from the ground, as the package can then be set on the floor of the garage, but other position can be employed as desired. Secure package door assembly 40 includes an outer portion 42, an inner portion 44, and a door 46 coupled by hinges 48 to outer portion 42. Outer portion 42 includes sidewalls 50 forming a rectangular frame 51 defining an access opening 49 and having an inner edge 52, an outer edge 54 and a perimetric flange 56 extending perpendicularly outwardly from outer edge 54. One of ordinary skill in the art will understand that while rectangular frame 51 is rectangular and defines a rectangular access opening in this embodiment, other shapes, such as square and the like, can be employed. Door 46 is fastened to outer portion 42 proximate outer edge 54 thereof, allowing door 46 to swing outwardly. Door 46 is movable between an open position allowing access to access opening 49 and a closed position closing access opening 49. In this specific embodiment, hinges 48 are coupled to the bottom of outer portion 42, and do not include a self-closing mechanism such as biasing springs, but this feature is possible. It will be understood that door 46 can be coupled to open in a different orientation, such as to the opposing side or bottom as desired. Inner portion 44 includes sidewalls 60 forming a generally rectangular frame 61 further defining access opening 49 and having an outer edge 62, an inner edge 64 and a perimetric flange 66 extending perpendicularly outwardly from inner edge 64. One of ordinary skill in the art will understand that while rectangular frame 61 is rectangular in this embodiment, other shapes, such as square and the like can be employed as long as it corresponds to the shape of frame 51. Rectangular frame 51 of outer portion 42 and rectangular frame 61 of inner portion 44 are fastened together to form secure package door assembly 40 and define access opening 49. Spacer posts 68 extend from perimetric flange 56 of outer portion 42 and apertures 69, aligned with posts 68, are formed through perimetric flange 66 of inner portion 44. Fasteners such as screws extend through apertures 69 and thread into spacer posts 68 firmly joining outer portion 42 and inner portion 44. Rectangular frame 51 of outer portion 42 and rectangular frame 61 of inner portion 44 are nested together when fastened, and include a latch slot 67 formed in rectangular frame 51. latch slot 67 receives a latch from lock mechanism 70. Lock mechanism 70 can include mechanical, remote and electrical mechanisms.

Figure 3:
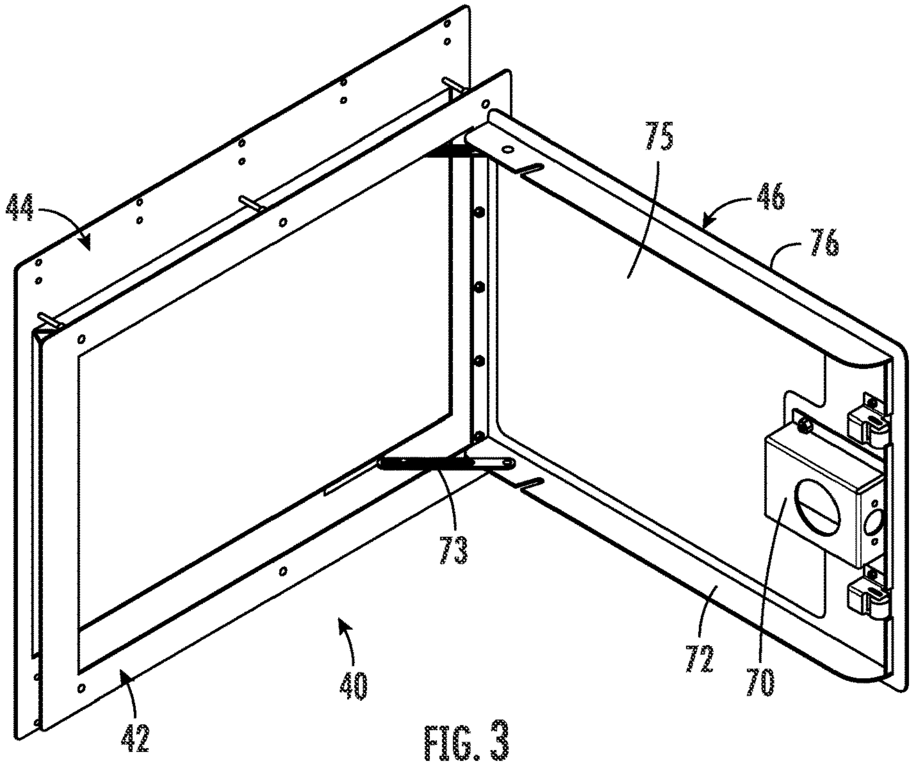
FIG. 3 is a perspective front view of the secure package door assembly of FIG. 1, according to the present invention, with an open door.
Figure 4:
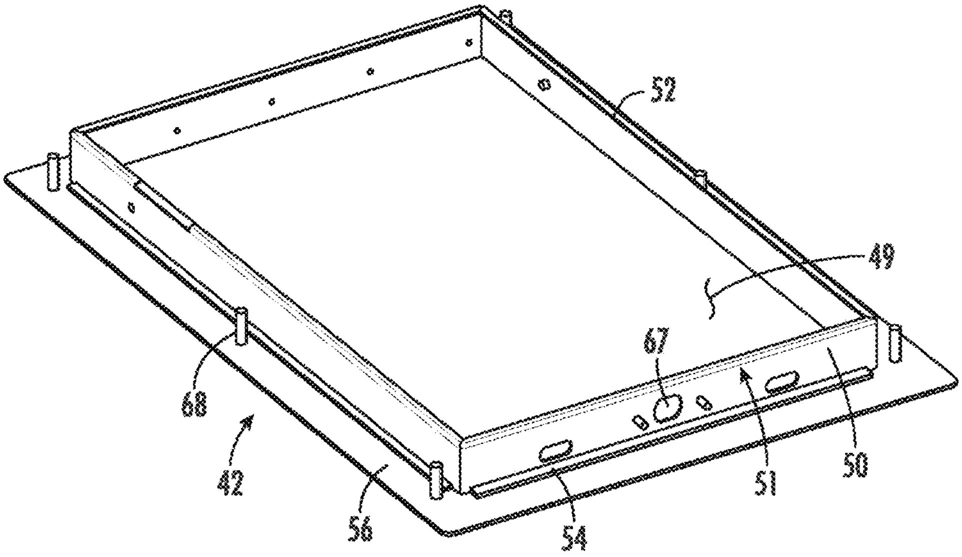
FIG. 4 is a perspective view of an outer portion of the secure package door assembly of FIG. 2.
Figure 5:
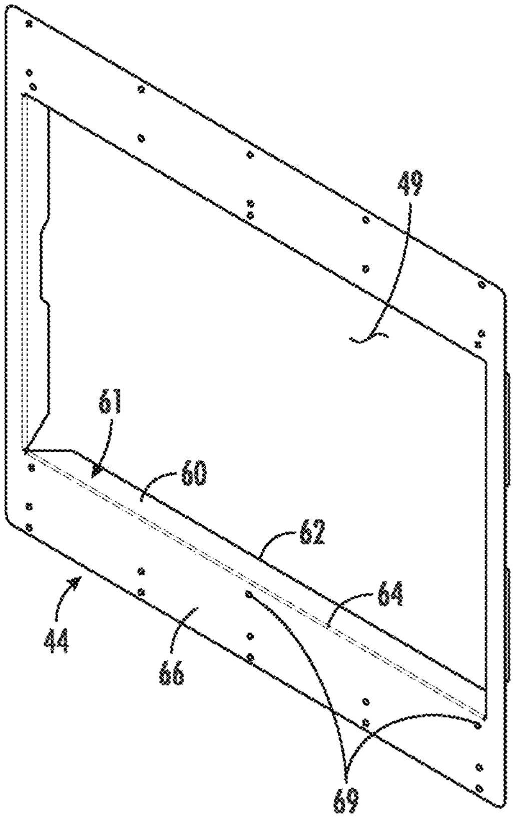
FIG. 5 is a perspective view of an inner portion of the secure package door assembly of FIG. 2.
Figure 6:
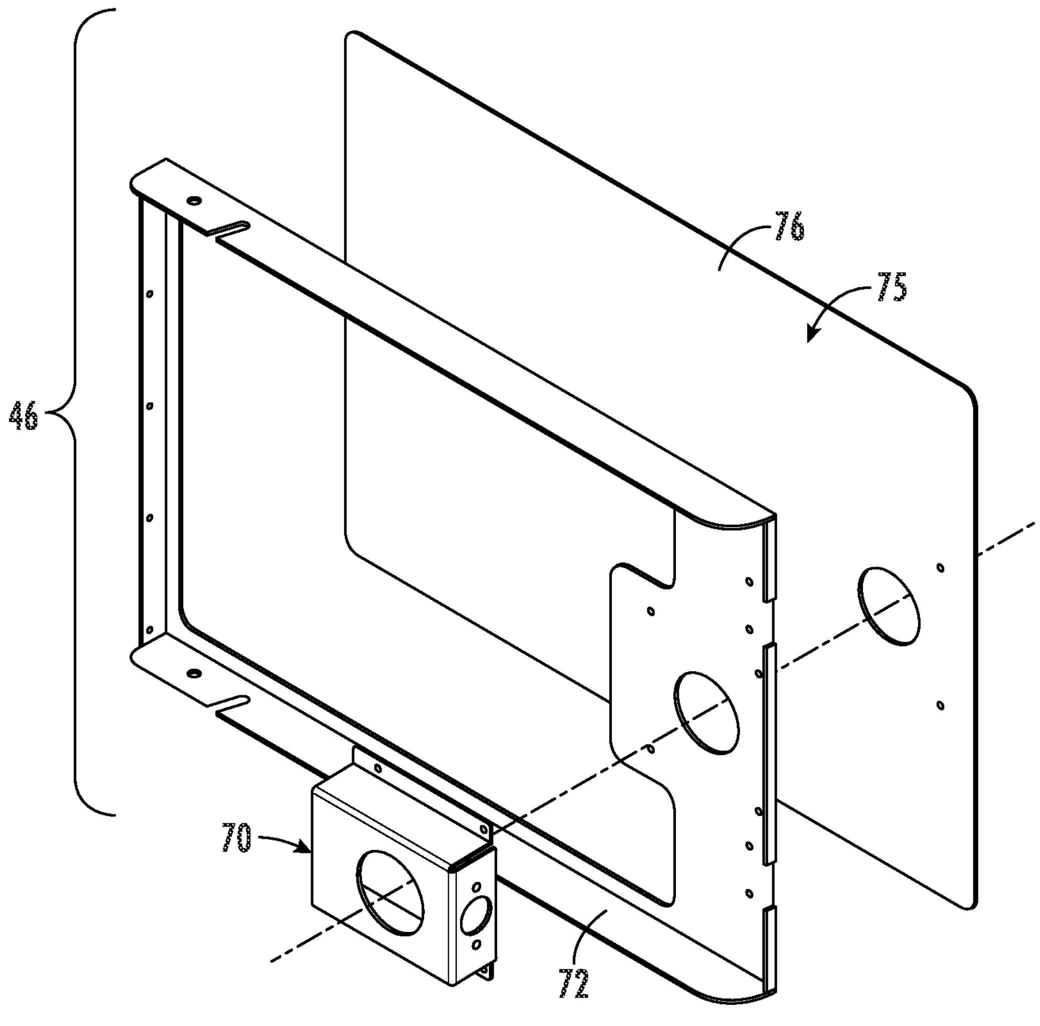
FIG. 6 is a perspective view of a door of the secure package door assembly of FIG. 2.

Referring specifically to FIGS. 3 and 6, door 46 includes a door frame 72 carrying a locking mechanism 70 and door stops 73 for preventing over extension of door frame 72. Door frame 72 is sized to fit flush within outer portion 42. A door panel 75 is coupled to the outer surface of door frame 72 and includes extension portions 76 extending beyond door frame 72. In the closed position (FIG. 2) extension portions 76 cover the gap between door frame 72 and outer portion 42, providing a weather fitting preventing ingress of wind, rain and the like.

Figure 8:
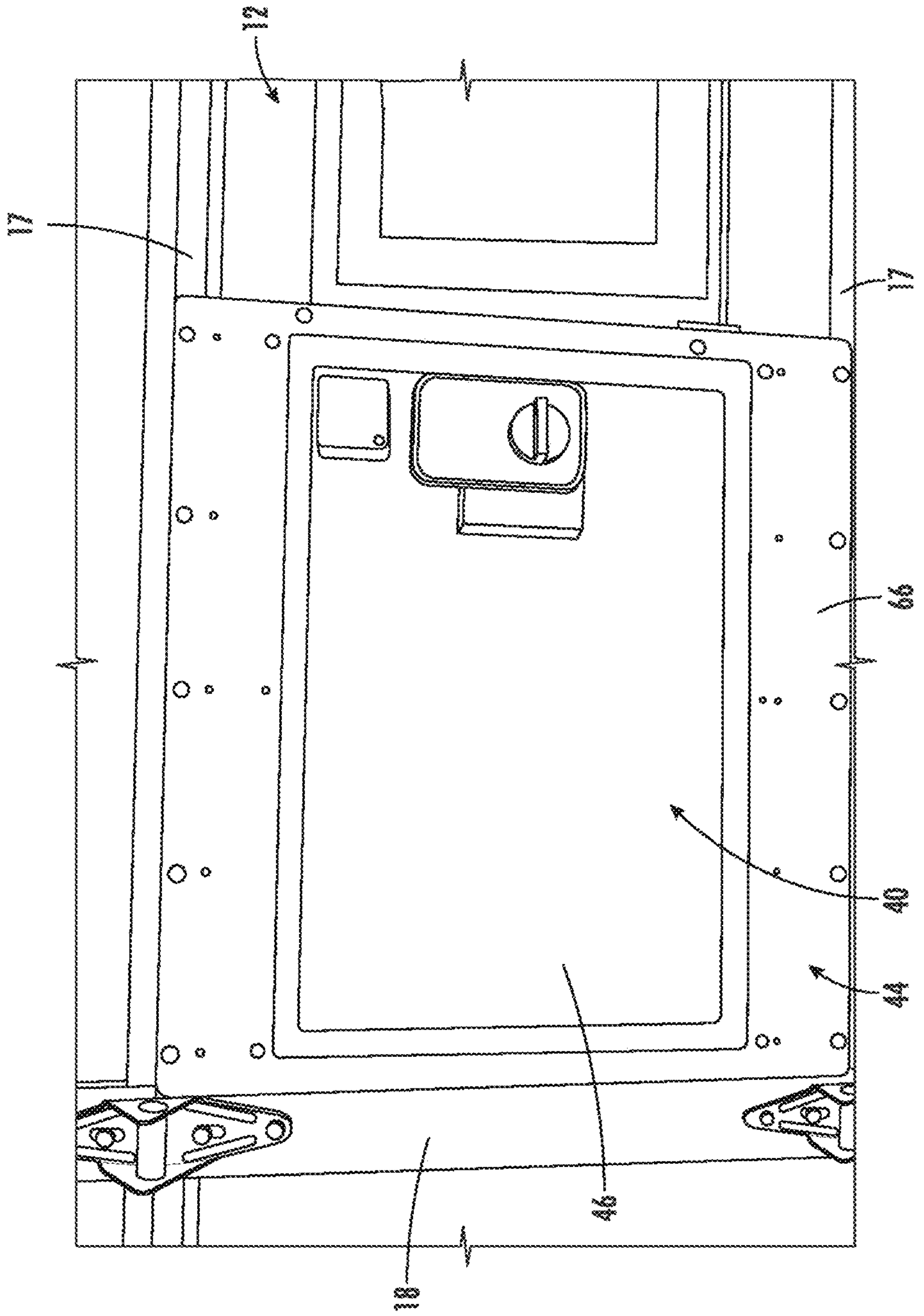
FIG. 8 is an enlarged partial view of the inside of the garage door with the secure package door assembly installed.

Secure package door assembly 40 is installed on garage door 10 by cutting an opening in insulation panels 22 from the specific panel 12 in which secure package door assembly 40 is to be installed, (FIG. 7) exposing a portion 14 of panel 12 to be removed. Portion 14 is bounded top and bottom by horizontal members 17 of framework 16. Portion 14 is also bounded left and right by vertical members 18. Secure package door assembly 40 is installed by placing outer portion 42 with flange 56 overlying the outside of garage door 10 and adjacent horizontal members 17 and one vertical member 18, and rectangular frame 51 directed inwardly, and placing inner portion 44 with flange 66 overlying the inside of adjacent horizontal members 17 and one vertical member 18 (FIG. 8) and rectangular frame 61 directed outwardly and engaging frame 51. Flange 66 is optionally fastened to horizontal members 17 and one vertical member 18, securing secure package door assembly 40 to garage door 10 by fastening members such as screws, clips, adhesive and the like. However, the primary securing feature securing secure package door assembly 40 to garage door 10 is that outer portion 42 and inner portion 44 are securely fastened together by spacer posts 68 and fasteners extending through apertures 69 to rigidly capture horizontal members 17 and one vertical member 18 between flanges 56 and 66, respectively, securely holding secure package door assembly 40 in position without requiring additional fasteners unless desired. Outer portion 42 and inner portion 44 are coupled to garage door 10 by compression between flanges 56 and 66 as fasteners are tightened into spacer posts 68. Flanges 56 and 66 capture the garage door including horizontal members 17, one vertical member 18 and portions of panel 12 therebetween. Additionally, secure package door assembly 40 is preferably positioned adjacent to and captures vertical member 18 on either the left or the right to provide addition stability.

Various changes and modifications to the embodiments herein chosen for purposes of illustration will readily occur to those skilled in the art. To the extent that such modifications and variations do not depart from the spirit of the invention, they are intended to be included within the scope thereof, which is assessed only by a fair interpretation of the following claims.

Having fully described the invention in such clear and concise terms as to enable those skilled in the art to understand and practice the same, the invention claimed is:

The invention claimed is:

1. A Garage door with a secure door assembly comprising:

a garage door including a horizontally extending panel having an inner surface, and an outer surface, a top edge, a bottom edge and an opening formed by the removal of a portion therefrom, a framework including parallel spaced apart horizontal members extending along the top edge and the bottom edge of the horizontally extending panel, the horizontal members bounding the opening;

a secure package door assembly carried by the horizontally extending panel, the secure package door comprising:

an outer portion, defining an access opening, inserted from the outer surface into the opening in the horizontally extending panel and coupled to the parallel spaced apart horizontal members;

an inner portion, defining an access opening, inserted from the inner surface into the opening in the horizontally extending panel and coupled to the parallel spaced apart horizontal members, the inner portion and the outer portion coupled together;

the outer portion and the inner portion are coupled to the parallel spaced apart horizontal members by capturing the parallel spaced apart horizontal members therebetween;

a door coupled by hinges to the outer portion and movable between an open position allowing access through the opening and the access openings and a closed position closing the opening and the access openings; and a locking mechanism locking the door in the closed position.

2. The Garage door with a secure door assembly as claimed in claim 1, further comprising a self-closing mechanism.

3. The Garage door with a secure door assembly as claimed in claim 2, wherein the self-closing mechanism includes one of a spring-loaded hinge and a cable pull door closer and a cable extending between the outer portion and the door.

4. The Garage door with a secure door assembly as claimed in claim 1, wherein the outer portion includes sidewalls forming a frame defining the access opening and having an inner edge, an outer edge and a perimetric flange extending perpendicularly outwardly from the outer edge, the perimetric flange abutting the outer surface of the horizontally extending panel adjacent the parallel spaced apart horizontal members.

5. The Garage door with a secure door assembly as claimed in claim 1, wherein the inner portion includes sidewalls forming a frame defining the access opening and having an inner edge, an outer edge and a perimetric flange extending perpendicularly outwardly from the outer edge, the perimetric flange abutting the inner surface of the horizontally extending panel adjacent the parallel spaced apart horizontal members.

6. The Garage door with a secure door assembly as claimed in claim 1, wherein the framework of the garage door includes a vertical member extending between the parallel spaced apart horizontal members with the outer portion and the inner portion abutting and capturing the vertical member therebetween.

7. A Garage door with a secure door assembly comprising:

a garage door including a horizontally extending panel having an inner surface, and an outer surface, a top edge, a bottom edge and an opening formed by the removal of a portion therefrom, a framework including parallel spaced apart horizontal members extending along the top edge and the bottom edge of the horizontally extending panel, the horizontal members bounding the opening;

a secure package door assembly carried by the horizontally extending panel, the secure package door comprising:

an outer portion including sidewalls forming a frame defining an access opening and having an inner edge, an outer edge and a perimetric flange extending perpendicularly outwardly from the outer edge, the inner edge inserted through the opening in the horizontally extending panel from the outer surface with the perimetric flange abutting the horizontally extending panel adjacent the parallel spaced apart horizontal members;

an inner portion including sidewalls forming a frame further defining the access opening and having an inner edge, an outer edge and a perimetric flange extending perpendicularly outwardly from the inner edge, the outer edge inserted through the opening in the horizontally extending panel from the inner surface with the perimetric flange abutting an inner surface of the parallel spaced apart horizontal members, the inner portion and the outer portion are coupled together capturing the parallel spaced apart horizontal members between the perimetric flange of the outer portion and the perimetric flange of the inner portion;

a door coupled by hinges to the outer portion and movable between an open position allowing access through the opening and the access openings and a closed position closing the opening and the access openings; and a locking mechanism locking the door in the closed position.

8. The Garage door with a secure door assembly as claimed in claim 7 wherein the inner portion and the outer portion are coupled together by spacer posts extending inwardly from the flange of outer portion and fasteners received in the spacer posts through apertures formed in the flange of the inner portion.

9. The Garage door with a secure door assembly as claimed in claim 7, further comprising a self-closing mechanism.

10. The Garage door with a secure door assembly as claimed in claim 9, wherein the self-closing mechanism includes one of a spring-loaded hinge and a cable pull door closer and a cable extending between the outer portion and the door.

11. The Garage door with a secure door assembly as claimed in claim 7, wherein the inner portion is coupled to the parallel spaced apart horizontal members by fasteners coupling the flange of the inner portion to the parallel spaced apart horizontal members.

12. The Garage door with a secure door assembly as claimed in claim 7, wherein the framework of the garage door includes a vertical member extending between the parallel spaced apart horizontal members with the outer portion and the inner portion abutting and capturing the vertical member therebetween.

13. A method of installing a secure door assembly in a garage door comprising the steps of:

providing a garage door including a horizontally extending panel having an inner surface, and an outer surface, a top edge, a bottom edge a framework including parallel spaced apart horizontal members extending along the top edge and the bottom edge of the horizontally extending panel;

forming an opening in the horizontally extending panel by the removing a portion therefrom between the parallel spaced apart horizontal members;

providing an outer portion including sidewalls forming a frame defining an access opening and having an inner edge, an outer edge and a perimetric flange extending perpendicularly outwardly from the outer edge;

inserting the inner edge through the opening in the horizontally extending panel from the outer surface until the perimetric flange abuts the outer surface of the horizontal extending panel adjacent the spaced apart horizontal members;

providing an inner portion including sidewalls forming a frame further defining the access opening and having an inner edge, an outer edge and a perimetric flange extending perpendicularly outwardly from the inner edge;

inserting the outer edge through the opening in the horizontally extending panel from the inner surface until the perimetric flange abuts an inner surface of the parallel spaced apart horizontal members with the inner portion and the outer portion coupled together; and coupling the outer portion and the inner portion to the parallel spaced apart horizontal members by capturing the parallel spaced apart horizontal members between the perimetric flange of the outer portion and the perimetric flange of the inner portion.

14. The method as claimed in claim 13 wherein the inner portion and the outer portion are coupled together by spacer posts extending inwardly from the flange of outer portion and fasteners received in the spacer posts through apertures formed in the flange of the inner portion.

15. The method as claimed in claim 13, further comprising the step of providing a self-closing mechanism.

16. The method as claimed in claim 13, further comprising the step of using fasteners to couple the inner portion to the parallel spaced apart horizontal members by fasteners.

17. The method as claimed in claim 13, further comprising the step of abutting and coupling the coupled inner portion and outer portion to a vertical member extending between the parallel spaced apart horizontal members.

* * * * *